US012308525B2

(12) United States Patent
Geng

(10) Patent No.: US 12,308,525 B2

(45) Date of Patent: May 20, 2025

(54) LENS ANTENNA, RADIO UNIT AND BASE STATION

(71) Applicant: Telefonaktiebolaget LM Ericsson (publ), Stockholm (SE)

(72) Inventor: Yi Geng, Nanjing Jiangsu (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 167 days.

(21) Appl. No.: 17/928,795

(22) PCT Filed: Jun. 16, 2020

(86) PCT No.: PCT/CN2020/096394

§ 371 (c)(1), (2) Date: Nov. 30, 2022

(87) PCT Pub. No.: WO2021/253237

PCT Pub. Date: Dec. 23, 2021

(65) Prior Publication Data

US 2023/0275358 A1 Aug. 31, 2023

(51) Int. Cl.

| | |
|---|---|
| ***H01Q 19/06*** | (2006.01) |
| ***H01Q 1/24*** | (2006.01) |
| ***H01Q 15/08*** | (2006.01) |

(52) U.S. Cl.

CPC ........... *H01Q 19/062* (2013.01); *H01Q 1/246* (2013.01); *H01Q 15/08* (2013.01)

(58) Field of Classification Search

CPC ...... H01Q 19/062; H01Q 1/246; H01Q 15/08; H01Q 3/26; H01Q 15/04

See application file for complete search history.

(56) References Cited

U.S. PATENT DOCUMENTS

| | | | | |
|---|---|---|---|---|
| 10,340,602 | B2 | 7/2019 | Tzuang et al. | |
| 2010/0031753 | A1 | 2/2010 | Mayer et al. | |
| 2018/0159244 | A1 * | 6/2018 | Tzuang | H01Q 3/245 |

FOREIGN PATENT DOCUMENTS

| | | | | |
|---|---|---|---|---|
| CN | 102508242 | A | 6/2012 | |
| CN | 105789843 | A | 7/2016 | |
| CN | 105890769 | A * | 8/2016 | |
| CN | 109904630 | A | 6/2019 | |
| CN | 110544826 | A | 12/2019 | |
| CN | 110729565 | A | 1/2020 | |
| CN | 110783697 | A | 2/2020 | |
| EP | 1772748 | A1 * | 4/2007 | G01S 13/931 |
| EP | 3005481 | A1 | 4/2016 | |
| RU | 2715914 | C1 | 3/2020 | |

OTHER PUBLICATIONS

Fernandes Dielectric Lens Antennas (Year: 2016).*

* cited by examiner

*Primary Examiner* — Dimary S Lopez Cruz
*Assistant Examiner* — Anna N Hamadyk
(74) *Attorney, Agent, or Firm* — Sage Patent Group

(57) ABSTRACT

A lens antenna, a radio unit and a base station are disclosed. According to an embodiment, the lens antenna comprises an antenna array and a lens unit having a first focal point at a first side of the lens unit and a second focal point at a second side of the lens unit opposite to the first side. The lens unit is able to cause at least part of beams emitted from the antenna array at the first side the lens unit to be converged at the second side of the lens unit.

12 Claims, 14 Drawing Sheets

LENS ANTENNA, RADIO UNIT AND BASE STATION

TECHNICAL FIELD

Embodiments of the disclosure generally relate to communication, and, more particularly, to a lens antenna, a radio unit and a base station.

BACKGROUND

This section introduces aspects that may facilitate better understanding of the present disclosure. Accordingly, the statements of this section are to be read in this light and are not to be understood as admissions about what is in the prior art or what is not in the prior art.

For future cellular networks (e.g. beyond 5th generation (B5G) and 6th generation (6G)), wider radio bandwidths will be needed but can be found only at high frequencies. There is no sharp border between low and high frequencies in general. However, 3rd generation partnership project (3GPP) has defined two frequency ranges (FRs), FR1 and FR2, for new radio (NR). Therefore, high frequencies usually mean FR2 (carrier frequencies 24.25 GHz) and even up to THz.

The high frequency band, for example, ranging from 24.25 GHz to 3 THz, are promising bands for B5G and 6G wireless communication systems. The short wavelengths and wider available bandwidths will increase data rate but the utilization of these spectrums will bring many challenges. One challenge is that high frequency band channels will attenuate very rapidly out to a few tens of meters or even meters. The attenuation of high band propagating wave is mainly caused by free space path loss, molecular absorption path loss, and Mie scattering by dust, rain, water vapor, snow or hail.

The molecular absorption has a substantial impact on the path loss especially at longer distances (1-10 dB/km at frequencies up to 400 GHz). However, the molecular impact is still small compared to the free space loss. FIG. 1 illustrates the effect of free space loss and molecular absorption at a distance of 10 m. As illustrated in FIG. 1, the THz radio spectrum can be divided into favorable spectrum windows between atmospheric absorption peaks above 500 GHz. These frequency band windows could easily be used for high speed B5G and 6G networks with up to hundreds meter-sized coverage range. In addition, the increase in free space loss is quite small when moving into the THz region from 30 GHz onwards. If the antenna area is kept constant, the free space loss may be compensated by the increase in the antenna gain.

The physical space needed for radio solutions will be reduced radically as the frequency increases. For example, an antenna array of 1000 antenna elements will fit into an area of less than 4 square centimeters at 250 GHz. Large antenna arrays to compensate higher path loss at high frequency bands, required to achieve a decent range for communications or sensing will result in extraordinarily narrow cell coverage. The size of an antenna element scales with the wavelength and with the inverse of the carrier frequency. The extremely small wavelengths enable extremely high antenna gain to be made in extremely small physical dimensions.

Lens antennas are antennas with single or multiple lenses. A lens antenna uses the convergence and divergence properties of a lens to transmit and receive signals. The size of the lens depends on the operating frequency. The higher the frequency is, the smaller the lens is. Due to this, lens antennas are generally used at high frequencies (millimeter wave and above) as lens can be quite bulky at lower frequencies. Lens is usually made up of glass, polystyrene, Lucite and polyethylene.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved lens antenna. In particular, one of the problems to be solved by the disclosure is that the existing lens antenna topology cannot be used for mobility scenarios.

According to a first aspect of the disclosure, there is provided a lens antenna. The lens antenna may comprise an antenna array, and a lens unit having a first focal point at a first side of the lens unit and a second focal point at a second side of the lens unit opposite to the first side. The lens unit may be able to cause at least part of beams emitted from the antenna array at the first side of the lens unit to be converged at the second side of the lens unit.

In this way, the lens antenna can be used for mobility scenarios.

In an embodiment of the disclosure, the lens unit may be able to converge at least part of beams emitted from the antenna array at the first focal point to the second focal point.

In an embodiment of the disclosure, the lens unit may be able to converge at least part of beams emitted from a terminal device within an expected coverage range of the lens antenna to the antenna array.

In an embodiment of the disclosure, a distance between the lens unit and the second focal point may be based on an expected coverage range of the lens antenna.

In an embodiment of the disclosure, the lens unit may be provided with a hole penetrating through the lens unit such that another part of the beams emitted from the antenna array can propagate through the hole without being converged by the lens unit.

In an embodiment of the disclosure, the hole may be provided at a center of the lens unit.

In an embodiment of the disclosure, the lens unit may be one lens.

In an embodiment of the disclosure, the one lens may be one of: a single refraction elliptical lens; a single refraction hyperbolic lens; a double refraction lens; and Maxwell fish-eye lens.

In an embodiment of the disclosure, the lens unit may be a combination of more than one lens.

In an embodiment of the disclosure, the combination of the more than one lens may be a pair of convex lenses spaced apart.

In an embodiment of the disclosure, the lens antenna may operate at frequencies above 24.25 GHz.

According to a second aspect of the disclosure, there is provided a radio unit. The radio unit may comprise the lens antenna according to the above first aspect.

According to a third aspect of the disclosure, there is provided a base station. The base station may comprise the radio unit according to the above second aspect.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Lens antennas may be classified based on three different physical characteristics. First, depending on the feed position relative to the lens body, lens antennas may be classified into off-body fed lens antenna or integrated lens antenna. In the off-body fed lens antenna, the focal points of the lens are well away from the lens and at a distance comparable with the diameter. In the integrated lens antenna, the lens can have the feed in direct contact with the lens body. Second, depending on the refractive index profile, lens antennas may be classified into constant refractive index lens antenna, stepped refractive index lens antenna, and non-uniform refractive index lens antenna. Third, depending on the number of refraction surfaces, lens antennas may be classified into single refraction lens antenna and double refraction lens antenna.

Figure 1:
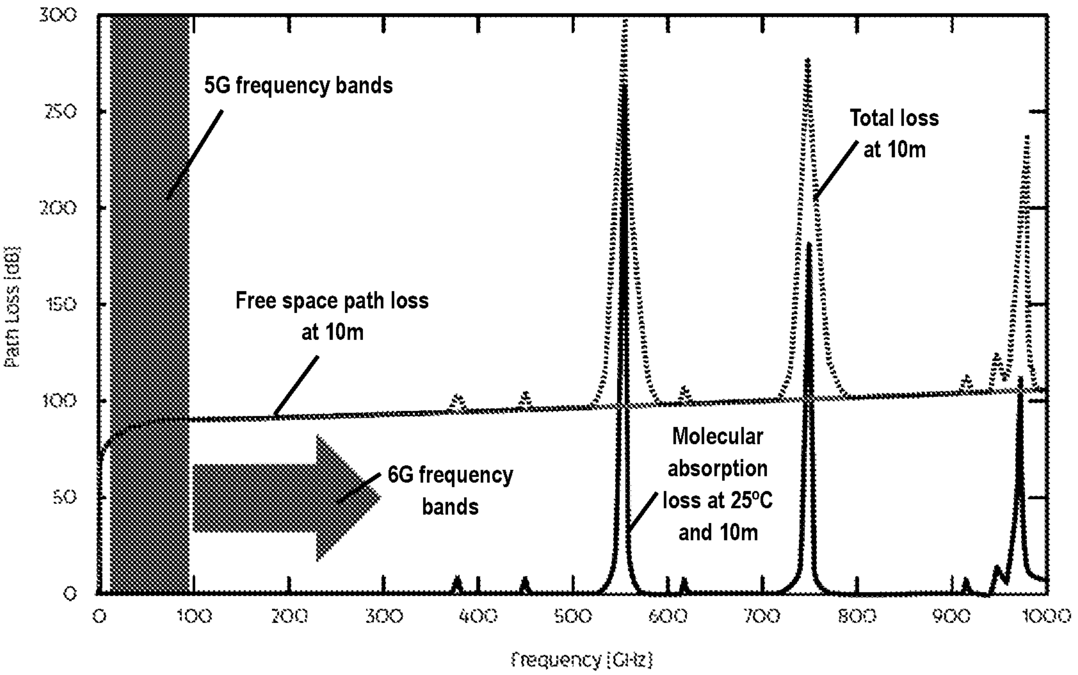
FIG. 1 is a diagram illustrating the effect of free space loss and molecular absorption.
Figure 2:
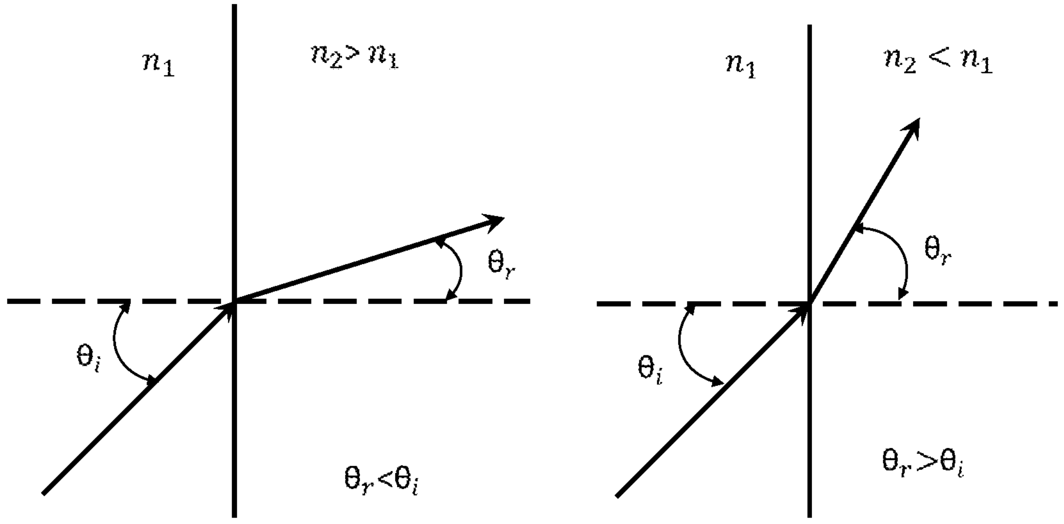
FIG. 2 is a diagram for explaining Snell's law.

Lens antennas may be designed by using Snell's law. As shown in FIG. 2, assuming that the interface between two dielectric media can be considered locally plane, then the refraction is governed by Snell's law as shown below:

$$n_1 \sin(\theta_i)=n_2 \sin(\theta_r),$$

where $n_1$ and $n_2$ are the refraction indexs of each medium, $\theta_i$ and $\theta_r$ are the incidence and refraction angles defined with respect to the interface normal. According to the Snell's law, the refracted wave is bent towards the surface normal if the wave enters a medium with higher refraction index, while it is bent away from the normal when exiting a medium with higher refraction index.

Figure 3:
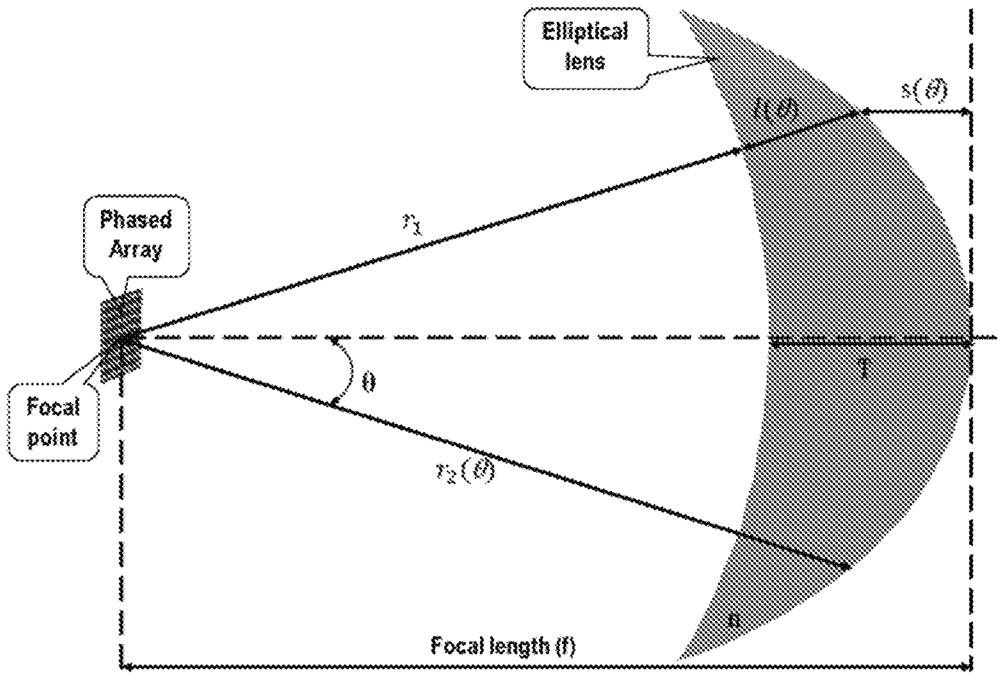
FIG. 3 (PRIOR ART)
FIG. 3 is a diagram illustrating an existing lens antenna with a single refraction elliptical lens.

FIG. 3 is a diagram illustrating an existing lens antenna with a single refraction elliptical lens. As shown, in the elliptical lens, the surface closer to the antenna has a spherical shape and does not refract any rays. The collimation of the rays is achieved by refracting from the outer surface of the elliptical lens. Suppose that the inner surface has a radius $r_1$ which may be predetermined and the shape of the outer surface can be represented by $r_2(\theta)$. Then, the shape of the outer surface in polar coordinates can be obtained by imposing the path length collimation condition (that is, the time required by traveling through $r_1$, $l(\theta)$ and $s(\theta)$ by electromagnetic wave is the same as the time required by traveling through $r_1$ and T by electromagnetic wave) as shown below:

$$r_1+nl(\theta)+s(\theta)=r_1+nT.$$

Note that n is the refraction index of the lens and the time required by traveling through the dielectric medium of the lens by electromagnetic wave is n times as large as the time required by traveling through the same distance by electromagnetic wave in vacuum. In addition, the following physical length condition is satisfied:

$$(r_1+l(\theta))\cos\theta+s(\theta)=r_1+T,$$

$$r_1+l(\theta)=r_2(\theta),$$

$$r_1+T=f,$$

where T is the lens selected thickness along the axis. With the above four equations, the outer surface profile can be expressed as:

$$r_2(\theta)=\frac{(n-1)f}{n-\cos\theta}.$$

Figure 4:
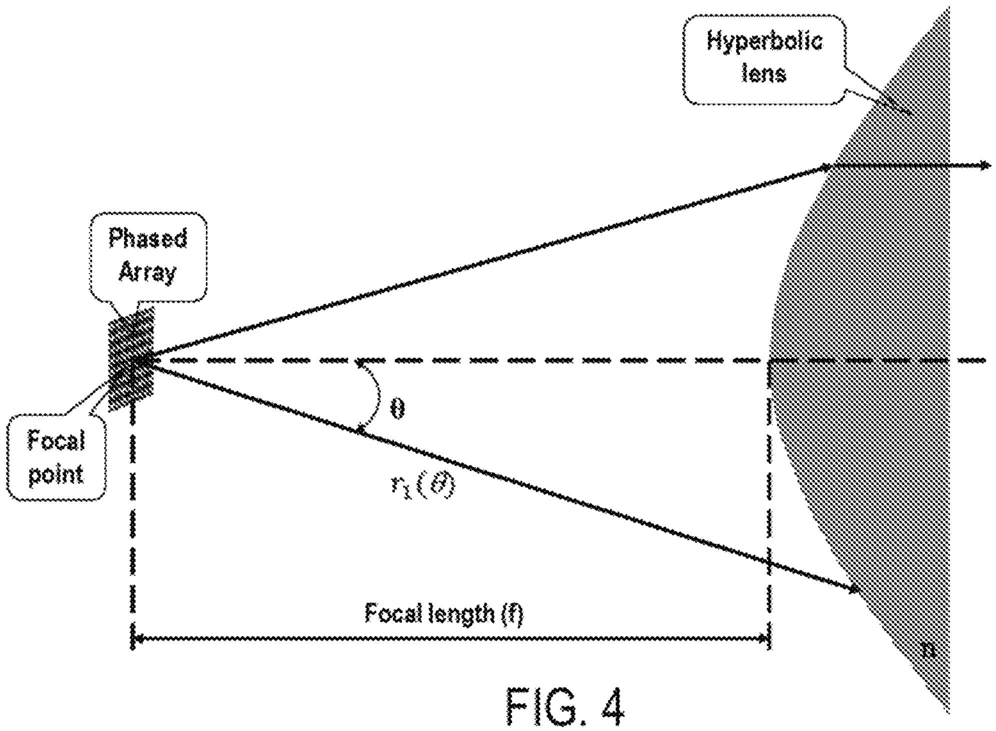
FIG. 4 (PRIOR ART)
FIG. 4 is a diagram illustrating an existing lens antenna with a single refraction hyperbolic lens.

FIG. 4 is a diagram illustrating an existing lens antenna with a single refraction hyperbolic lens. As shown, in the hyperbolic lens, the refraction occurs in the hyperbolic lens surface closer to the antenna. In this configuration, the outer lens surface is planar and does not refract the rays. The shape of the inner surface, which is represented by $r_1(\theta)$, can be calculated similarly by imposing the path length collimation condition and physical length condition.

Figure 5:
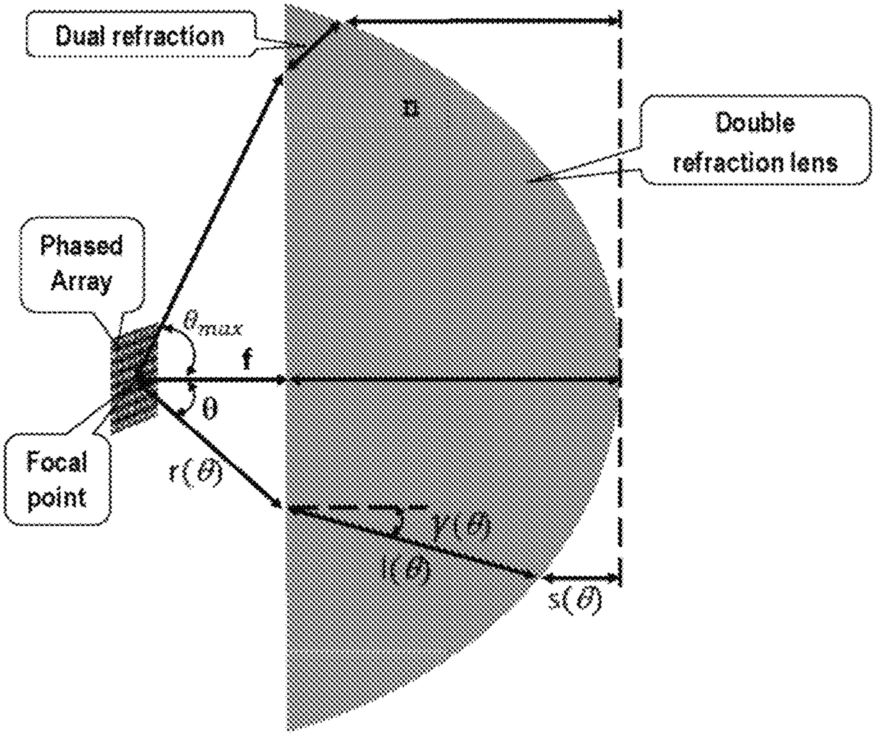
FIG. 5 (PRIOR ART)
FIG. 5 is a diagram illustrating an existing lens antenna with a double refraction lens.

FIG. 5 is a diagram illustrating an existing lens antenna with a double refraction lens. As shown, the lens with two refracting surfaces allows more control of the radiation pattern characteristics, according to Snell's law. Based on geometric optics method, the coordinates of the inner surface and outer surface can be determined. The main advantage of double refraction lens over single refraction lens is that maximum ° max is larger than single refraction lens. As a result, the dual refraction lens can support a larger steering range for the array antenna.

Figure 6:
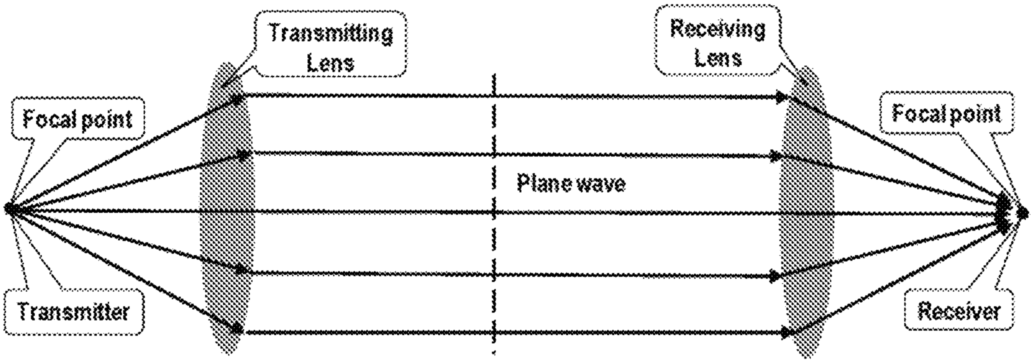
FIG. 6 (PRIOR ART)
FIG. 6 is a diagram illustrating an application example of the existing lens antenna.

FIG. 6 is a diagram illustrating an application example of the existing lens antenna. As shown, in the transmitter side, diverging rays are collimated which forms plane wave front after they are incident on the lens and have come out of it. Collimation occurs due to refraction mechanism. In the receiver side, parallel rays converge at the focal point after they have passed through the lens due to refraction mechanism. Therefore, the existing microwave lens antenna application (for example, in wireless backhaul, data centers, etc.) is for point-to-point network topology in which a kind of lens is placed in front of the transmitter antenna to concentrate the radiated energy into a narrow beam or to focus received energy on the receiving antenna. The electromagnetic wave's propagation is very close to the properties of light when the frequency increases to millimeter wave and above.

Figure 7:
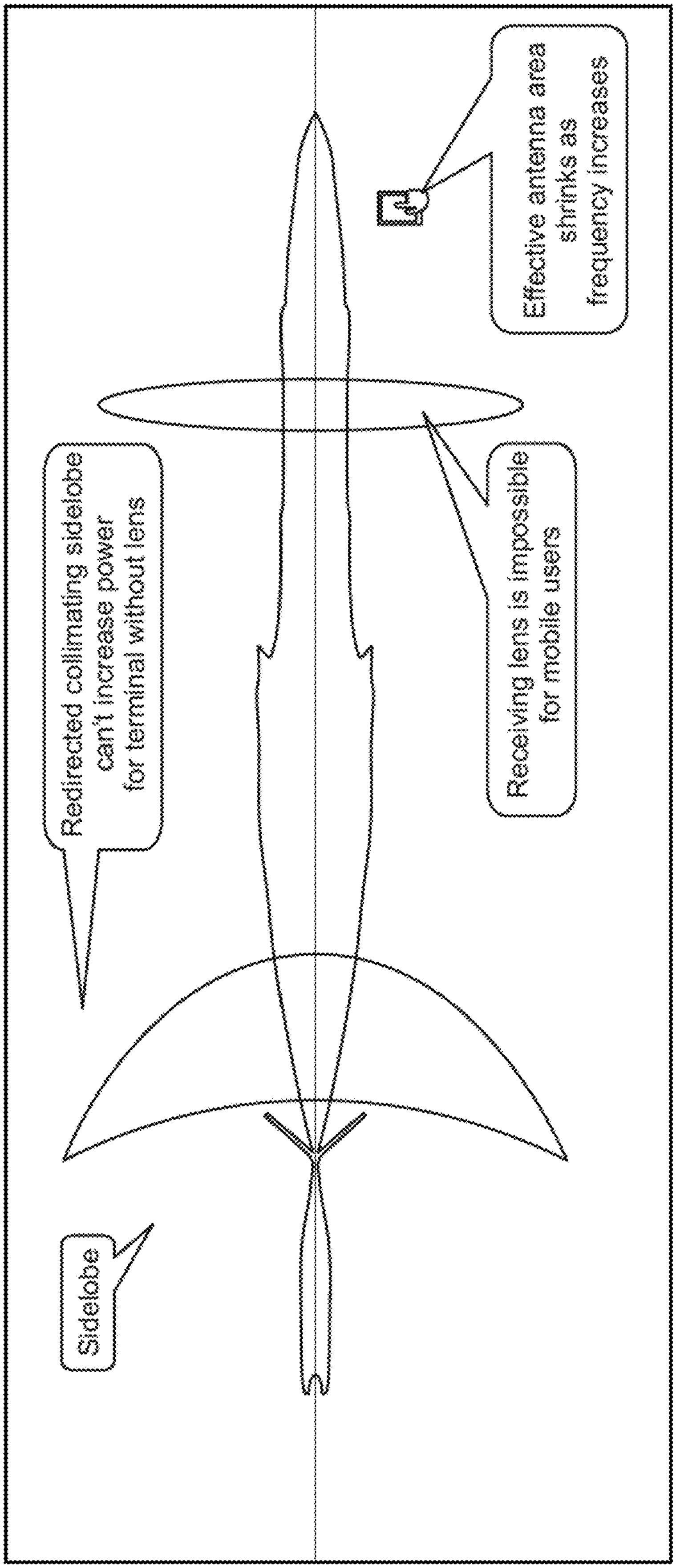
FIG. 7 (PRIOR ART)
FIG. 7 is a diagram illustrating the drawback of the existing lens antenna.

The above conventional lens antenna solution is not beneficial to cellular network scenarios. For point-to-point network topology, the receiving antenna is located at a fixed position, and the receiving lens is placed in front of the receiving antenna and increases the receiving antenna aperture (effective antenna area). However, for 5G&6G cellular network, this lens antenna topology cannot be used for mobility scenarios. As shown in FIG. 7, lens cannot be integrated in user terminals due to the limitation of terminal size and misalignment to wavefront direction is inevitable for moving users. Without receiving lens, the antenna aperture (effective antenna area) of the receiving antenna will shrink as the frequency increases.

In addition, conventional side lobe suppression (SLS) methods (e.g. tapering) have been implemented in almost all directional antenna systems, to solve signal leakage in the directional antenna. However, these conventional SLS methods are too complex to be implemented for large antenna arrays working in high frequency bands in practical use. In the worst case, these suppression methods cannot suppress side lobes totally.

Figure 8:
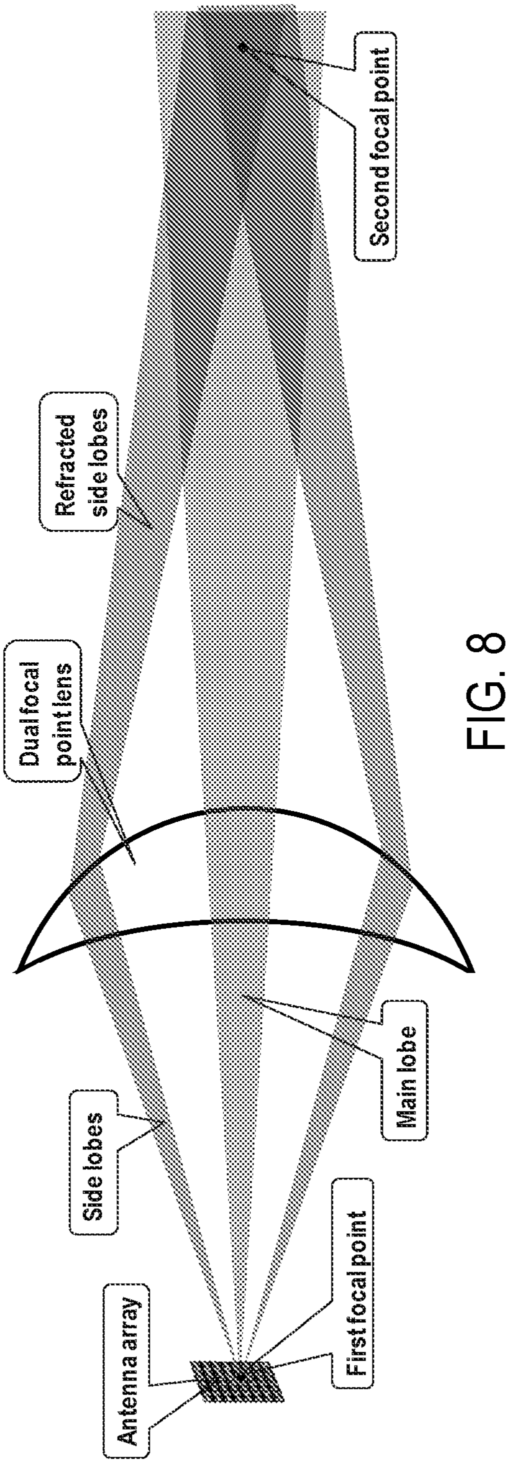
FIG. 8 is a diagram illustrating a lens antenna according to an embodiment.

The present disclosure proposes an improved solution for lens antenna, radio unit and base station. FIG. 8 is a diagram illustrating a lens antenna according to an embodiment of the disclosure. As shown, the lens antenna comprises an antenna array and a lens having a first focal point at a first side of the lens (e.g. the left side in FIG. 8) and a second focal point at a second side of the lens (e.g. the right side in FIG. 8) opposite to the first side. Hereafter in this disclosure, the first focal point refers to the inner focal point at the inner side of the lens, and the second focal point refers to the outer focal point at the outer side of the lens. Thus, the lens may also be referred to as a dual focal point lens hereinafter. The first side may also be referred to as an inner side and the second side may also be referred to as an outer side hereinafter. The lens is able to converge at least part of beams emitted from the antenna array at the first focal point to the second focal point. Since the propagation path is reversible, the lens is able to converge at least part of beams emitted from a terminal device at the second side of the lens within an expected coverage range of the lens antenna to the antenna array.

As described later, there may be two options for the expected coverage range. As the first option, the distance between the lens and the second focal point may be relatively large and this distance may be used to basically reflect the expected coverage range. In other words, the expected coverage range may be based on this distance. As the second option, the distance between the lens and the second focal point may be relatively small smaller and the angle formed between the refracted beams diverged from the second focal point may be used to basically reflect the expected coverage range. In other words, the expected coverage range may be based on the formed angle.

Optionally, as described later, the lens may be provided with a hole penetrating through the lens such that another part of the beams emitted from the antenna array can propagate through the hole without being converged by the lens. Optionally, the lens antenna may operate at high frequencies (e.g. above 24.25 GHz). Typical lens radius that copes with the geometrical optics approximation range from 10 to 30 wavelengths. For example, with respect to the frequency band of 30-300 GHz, the supported link distance is about 100 meters. For the frequency band of 28 GHz, the wavelength is about 1 centimeter and the lens radius is about 10-30 times as large as the wavelength, i.e. 10-30 centimeters. With respect to the frequency band of 0.3-3 THz, the supported link distance is smaller than 10 meters. For the frequency band of 0.28 THz, the wavelength is about 0.1 centimeter and the lens radius is about 1-3 centimeters. For the frequency band of 2.8 THz, the lens radius is about 1-3 millimeters. Note that the lens antenna according to the embodiment may also operate at other frequencies (e.g. relatively lower frequencies) at the expense of larger size and weight.

Hereinafter, several embodiments will be described in detail with reference to FIGS. 9-22 to explain the features of the lens antenna mentioned above.

Figure 9:
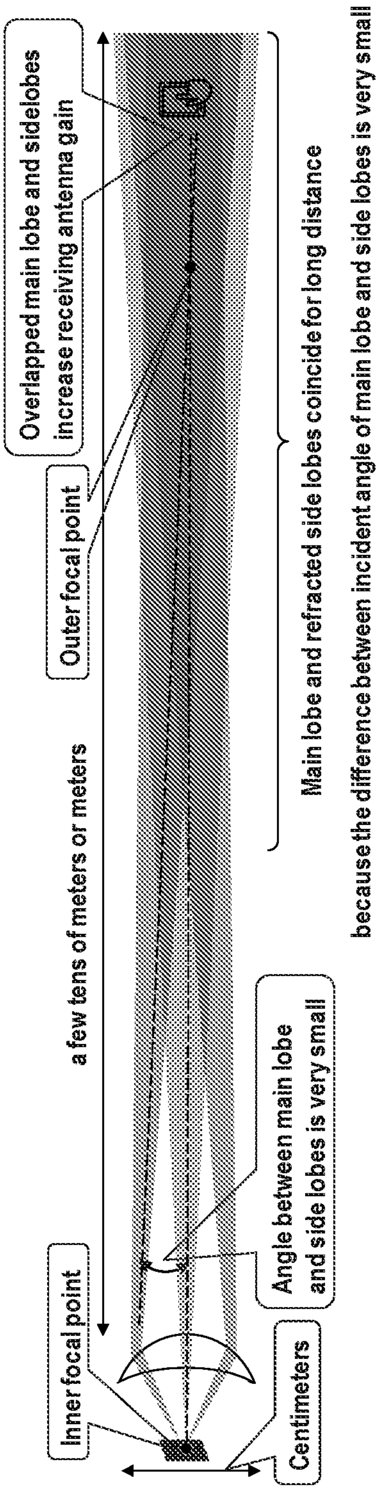
FIG. 9 is a diagram illustrating a lens antenna according to an embodiment.

FIG. 9 is a diagram illustrating a lens antenna according to an embodiment of the disclosure. This embodiment corresponds to the downlink scenario and the first option for the expected coverage range mentioned above. As shown in FIG. 9, a dual focal point lens is placed in front of the antenna array to refract the rays and concentrate the radiated energy to the wanted direction (e.g. the main lobe direction). The dual focal point lens has two focal points, the inner focal point and the outer focal point. Diverging rays (main lobe and side lobes) are emitted from the inner focal point and refracted by the dual focal point lens. The refracted rays converge to the outer focal point which is located at the area to be covered (or the expected coverage range). Note that for the sake of simplicity, only a pair of side lobes are drawn in the figures. Actually, there are many side lobes for a large antenna array.

As described in the background section, the physical space needed for an antenna array will be reduced radically as the frequency increases. The surface area of several square centimeters could host thousands of antennas at high frequency bands. In this situation, as shown in FIG. 9, the angle between the main lobe and the refracted side lobes is very small, and thus, the main lobe and the refracted side lobes converge and coincide for a very long distance. The overlapped main lobe and side lobes can increase the downlink antenna gain.

Figure 10A:
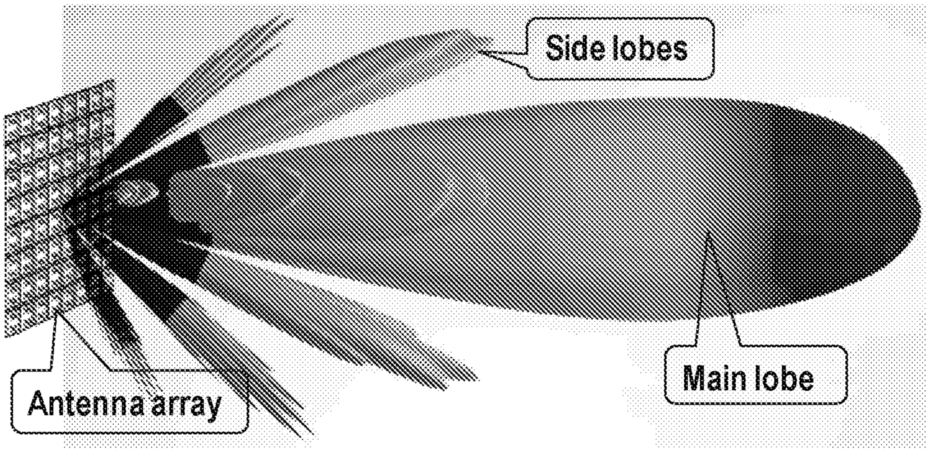
FIGS. 10A-10B are diagrams illustrating the beam shape of an antenna array.
Figure 10B:
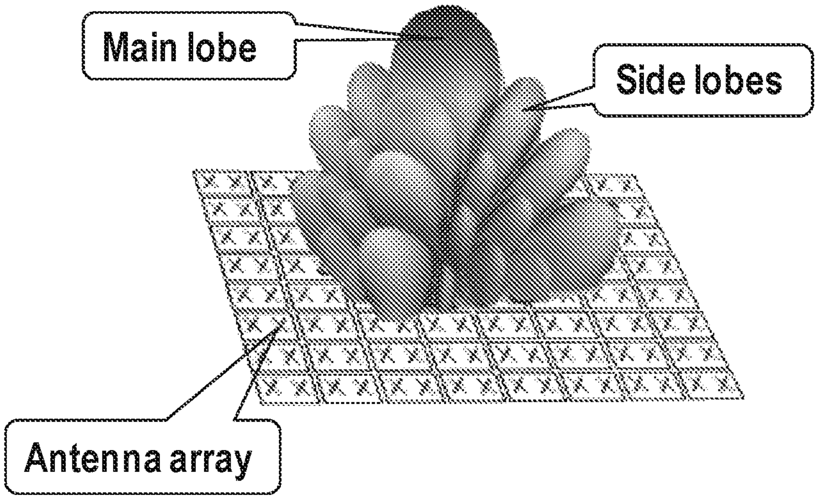

FIGS. 10A-10B are diagrams illustrating the beam shape of an antenna array. As shown, for an antenna array used for cellular network, most of the energy (about 80%-90% without any side lobe suppression methods) is concentrated in the main lobe which may be considered a conical shape. However, the energy of a beam cannot be confined entirely within the limits of the main lobe. Outside the main lobe, the strength of the wave diminishes rapidly, except in several side lobes where the power increases again.

With the dual focal point lens solution shown in FIG. 9, most of the side lobe energy can be concentrated by the refraction. Thus, there is no need to perform conventional side lobe suppression for the solution shown in FIG. 9, which leads to a low design complexity and better performance as well.

Assume that the dual focal point lens concentrates most of the side lobe energy (10%-20% of the total transmission power) to the main lobe steering range, which is not difficult for the current optics technologies. Then, with the proposed solution, the main lobe antenna downlink gain will increase 0.46 dB to 1 dB, as calculated below:

$$10\log((20\%+80\%)/80\%)=1\text{ dB},$$

$$10\log((10\%+90\%)/90\%)=0.46\text{ dB}.$$

Figure 11:
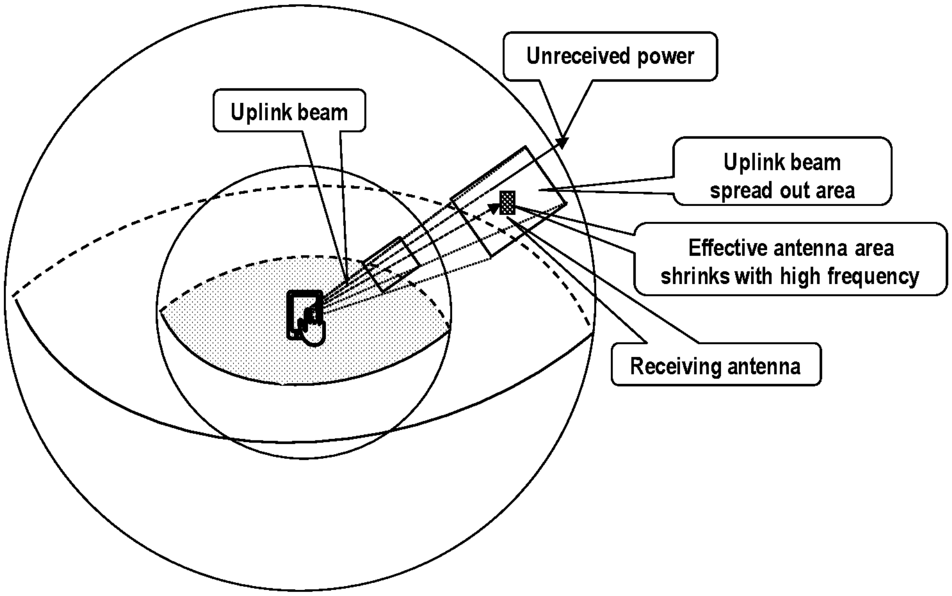
FIG. 11 is a diagram illustrating an uplink transmission from a terminal device to an antenna array.

FIG. 11 is a diagram illustrating an uplink transmission from a terminal device to an antenna array. Due to the limitations of power consumption and beamforming capabilities, the uplink beam from the terminal device is usually wide. As shown, the uplink beam emitted by the terminal device is spread out in space and the power density decreases. As mentioned above, in high frequency bands, the dimension of the antenna panel becomes very small. Thus, the effective antenna area is quite small than the uplink beam spread out area, which leads to low uplink received power without lens.

Figure 12:
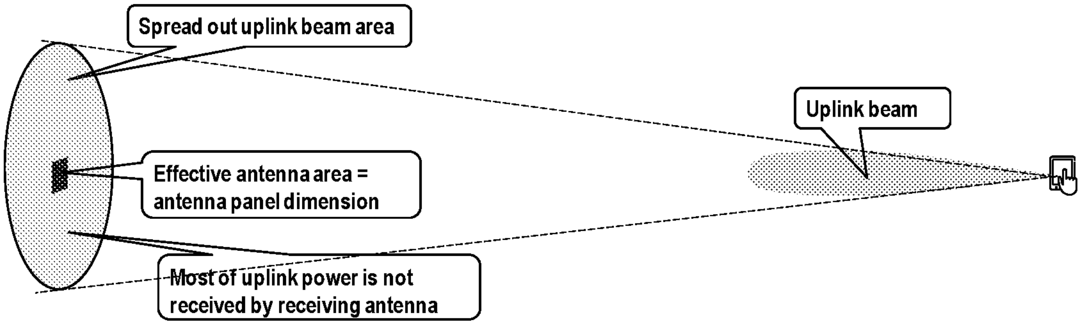
FIG. 12 is a diagram illustrating an uplink transmission from a terminal device to an antenna array.

FIG. 12 illustrates uplink beam propagation for a conventional antenna. As shown, the effective antenna area (antenna aperture) is equal to the antenna panel physical dimension. The effective antenna area is quite small at high frequencies. Thus, most of the uplink radiated power is not received by the receiving antenna.

Figure 13:
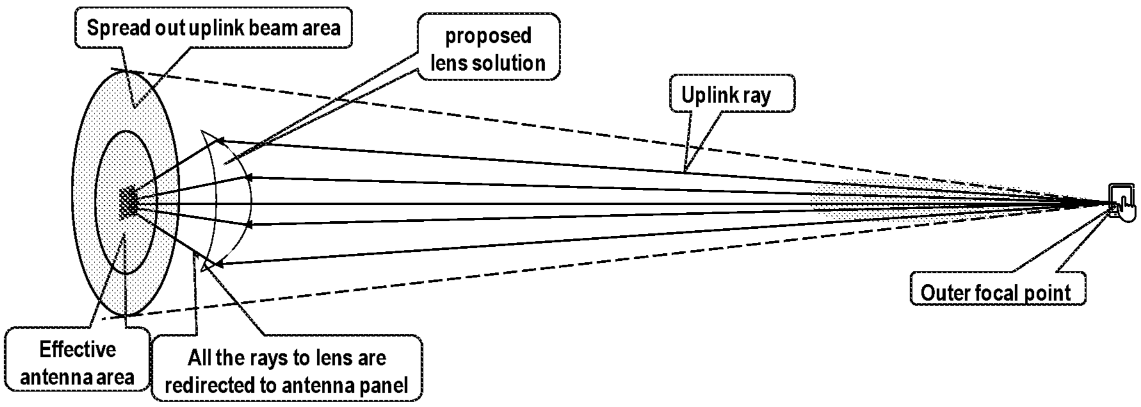
FIG. 13 is a diagram illustrating a lens antenna according to an embodiment.

In contrast, FIG. 13 illustrates a lens antenna according to an embodiment of the disclosure. This embodiment corresponds to the uplink scenario and the first option for the expected coverage range mentioned above. As shown, all the rays pointing to the lens can be redirected to the antenna panel. This means the effective antenna area (antenna aperture) has the same size as the lens. Thus, the effective antenna area can be increased by the dual focal point lens.

The typical lens radius that copes with the geometrical optics approximation ranges from 10 to 30 wavelengths. In high frequency bands examples, the wavelength of frequency band 28 GHz is 1 cm and the wavelength of frequency band 280 GHz is 1 mm. The corresponding lens radius is 10 cm-30 cm and 1 cm-3 cm respectively. Assume that an antenna array for 280 GHz has 32*32 dual-polarization configuration, the wavelength λ is 1 mm, and the length of each antenna element is one half of the wavelength. Then, the area taken by these antenna elements can be calculated as:

$$32*32*\left(\frac{\lambda/2}{\sqrt{2}}\right)^2=128\text{ mm}^2.$$

Considering the margins provided between the antenna elements, the antenna panel dimension is about 200 mm². According to that the lens radius that copes with the geometrical optics approximation ranges from 10 to 30 wavelengths, the lens dimension can be calculated as:

$$\pi*\lambda^2=3142826\text{ mm}^2.$$

Then, the uplink gain with the dual focal point lens antenna will increase 2 dB to 11.5 dB, as calculated below:

$$10\log(314/200)=2\text{ dB},$$

$$10\log(2826/200)=11.5\text{ dB}.$$

Figure 14:
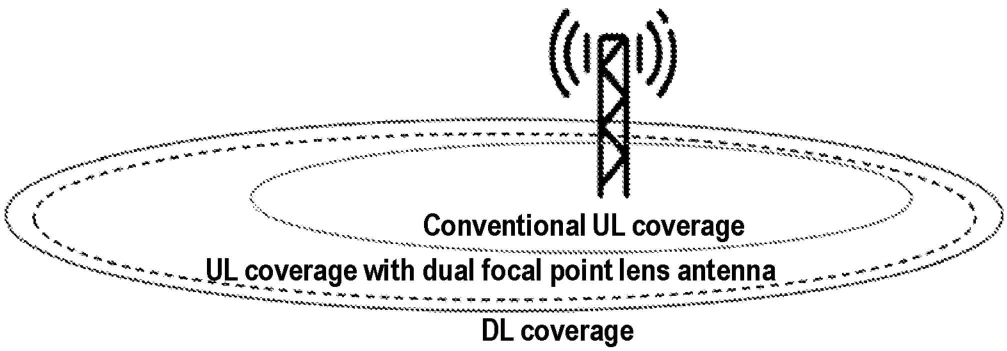
FIG. 14 is a diagram illustrating the effect of the lens antenna of FIG. 13.

Based on the above embodiments shown in FIGS. 9 and 13, the dual focal point lens antenna can have additional 0.46~1 dB downlink gain and additional 2~11.5 dB uplink gain for an antenna array working in 280 GHz with 32×32 dual-polarization configuration. Considering that cellular network coverage is limited by uplink due to the power and hardware restrictions of terminal devices, the dual focal point lens antenna can boost uplink gain greatly than downlink gain such that uplink cell coverage can be expanded, as shown in FIG. 14.

Figure 15:
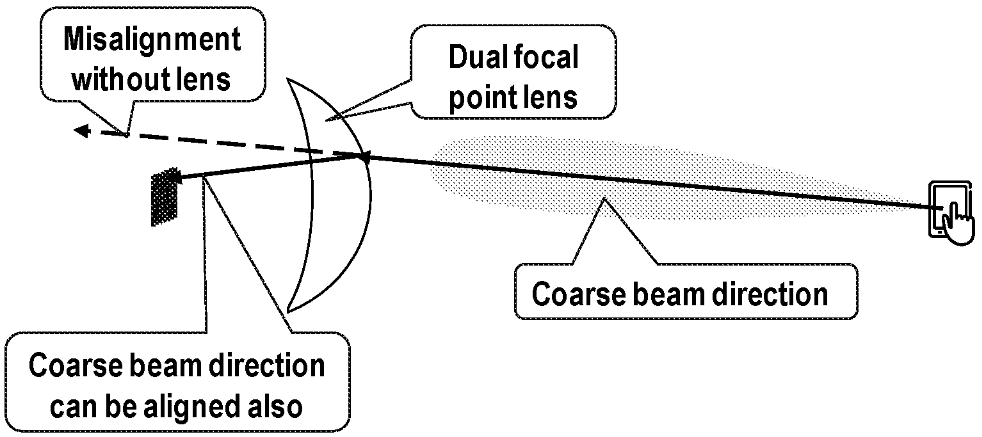
FIG. 15 is a diagram illustrating the effect of the lens antenna of FIG. 13.

In addition, channel estimation incurs significant training overheads. This problem becomes even more challenging in mobile scenarios, because the paths keep changing. The transmitter then needs to frequently send pilot beams to update the estimation results, leading to a considerable increase in training overheads and thus a dramatic decrease in data throughput. However, with the embodiment shown in FIG. 13, coarse channel information is enough for beam alignment, as shown in FIG. 15.

Figure 16:
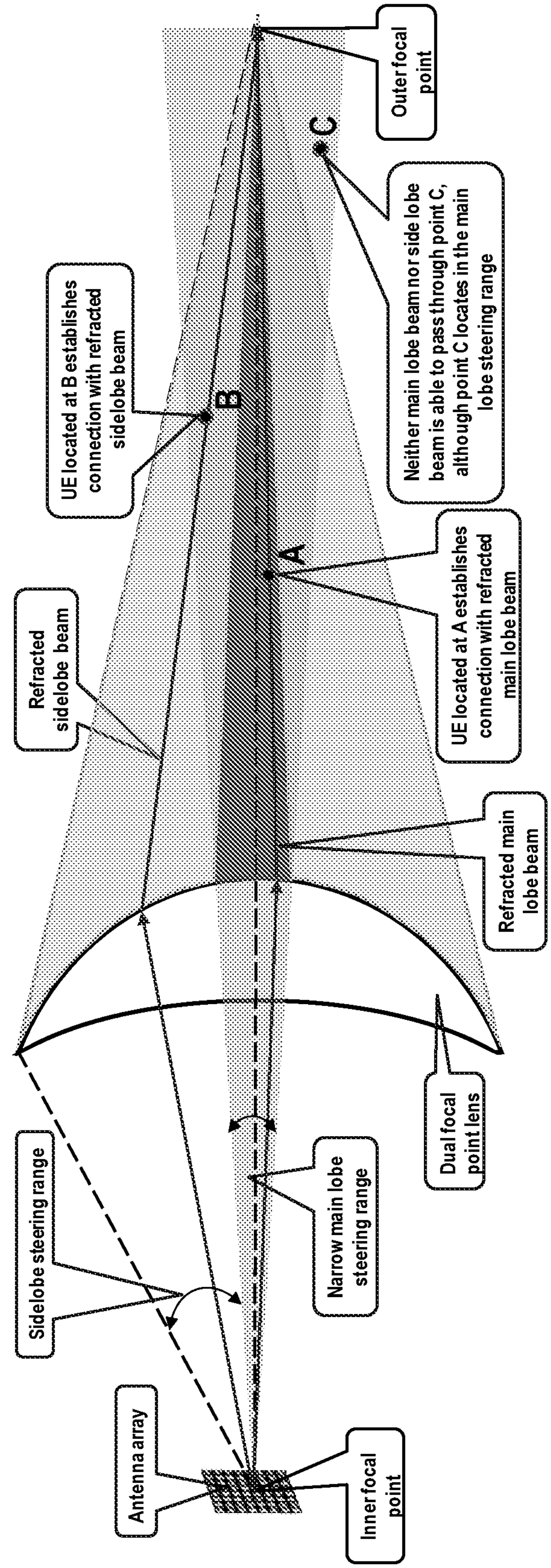
FIG. 16 is a diagram illustrating a lens antenna according to an embodiment.

FIG. 16 illustrates a problem that may exist in the embodiment shown in FIG. 9. The principle of the dual focal point lens used in the embodiment of FIG. 9 is that all the rays emitted from the inner focal point are pointed to the outer focal point after the refraction of the lens. Thus, a large antenna array for high frequency bands may have a narrow main lobe coverage, as shown in FIG. 16. In a case where a terminal device moves around, beam sweeping and tracking functionality may be performed to track the movement of the terminal device. The beamformed wave may be refracted by the lens after the wave incidents on the outer surface of the lens. Then, the lens coverage space will be divided into two parts, the part covered by the refracted main lobe beam and the part covered by the refracted side lobe beams. For example, the terminal device located at the point A can be served by the refracted main lobe beam. The terminal device located at the point B can be served by the refracted side lobe beams. However, the terminal device located at the point C cannot be served by the lens antenna because none of the beams can propagate to the point C. Therefore, although the power is concentrated, the coverage area of the dual focal point lens is shrunk.

Figure 17:
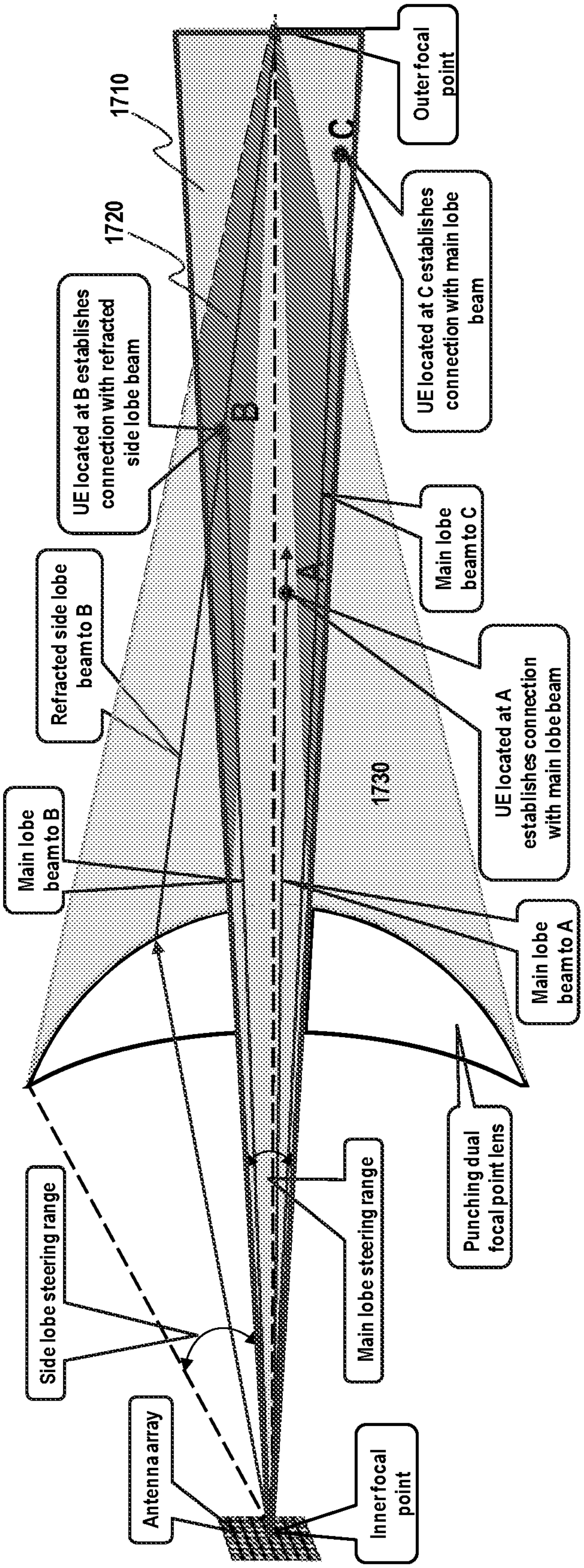
FIG. 17 is a diagram illustrating a lens antenna according to an embodiment.

To overcome the problem shown in FIG. 16, FIG. 17 illustrates a lens antenna according to another embodiment of the disclosure. This embodiment corresponds to the downlink scenario, the first option for the expected coverage range and the optional penetrating-hole feature mentioned above. The penetrating-hole feature may also be referred to as punched dual focal point lens, which can boost dual focal point lens antenna coverage. As shown in FIG. 17, according to the main lobe steering range, the dual focal point lens is punched with a space of a conical hole. In this way, the main lobe beam steers and tracks the terminal device within the main lobe steering range (the conical area 1710) since the main lobe beam will not be refracted. The lens coverage space is divided into three parts 1710, 1720 and 1730. From geometrical optics theory, only the main lobe beam can cover the area 1710, only side lobe beams can cover the area 1730, and both the main lobe and side lobes can cover the area 1720. For example, the terminal device located at the point B can be served by both the refracted side lobe beams and main lobe beam. The terminal device located at the point C can be served by the main lobe beam. Compared with the embodiment of FIG. 16, the coverage area of the punched dual focal point lens is boosted and the spatial multiplexing gain can be obtained in the area 1720.

Figure 18A:
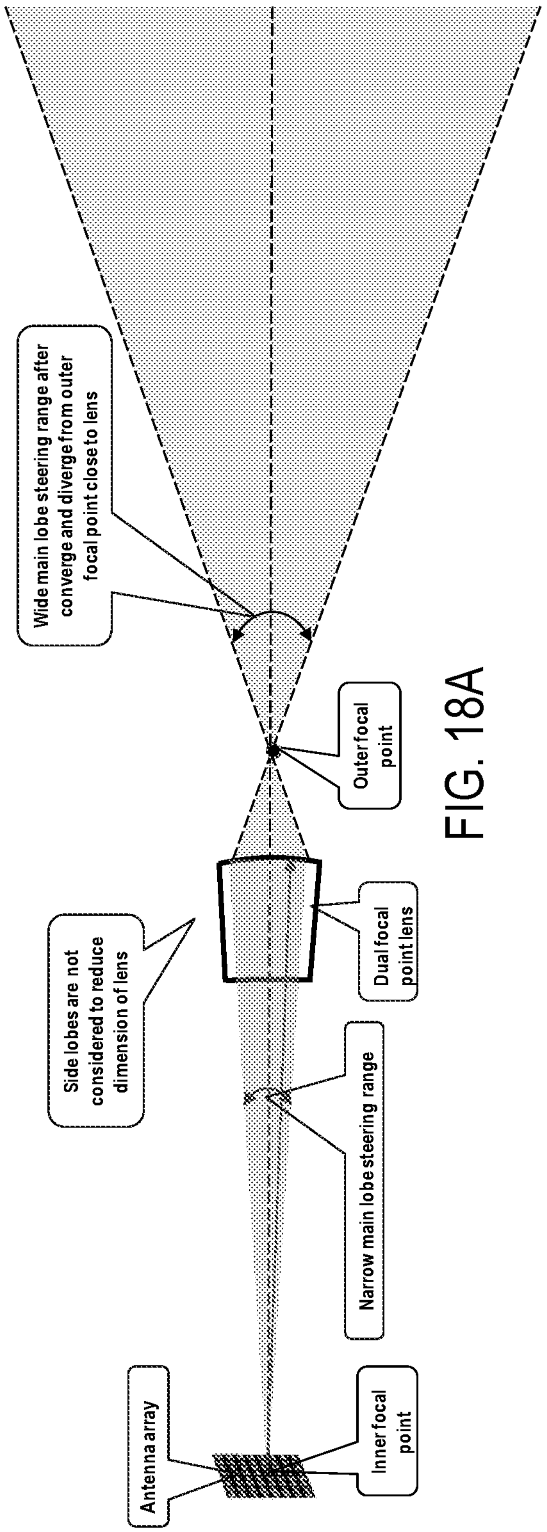
FIG. 18A is a diagram illustrating a lens antenna according to an embodiment.
Figure 18B:
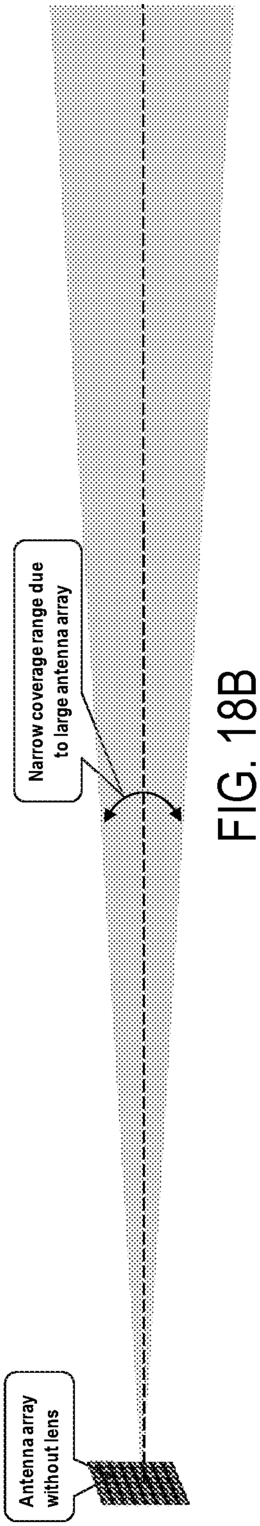
FIG. 18B is a diagram illustrating the coverage range of an antenna array.

FIG. 18A is a diagram illustrating a lens antenna according to an embodiment of the disclosure. This embodiment corresponds to the downlink scenario and the second option for the expected coverage range mentioned above. As shown in FIG. 18A, the dual focal point lens having an outer focal point close to the lens is used for widening pencil cell coverage, such that the rays that converge to the outer focal point will diverge to a wide range than a conventional high frequency antenna array shown in FIG. 18B. Optionally, as shown in FIG. 18A, if the side lobe gain is not needed, the lens physical dimension can be reduced to keep the central part only to minimize the antenna size for micro-scale applications.

Figure 19:
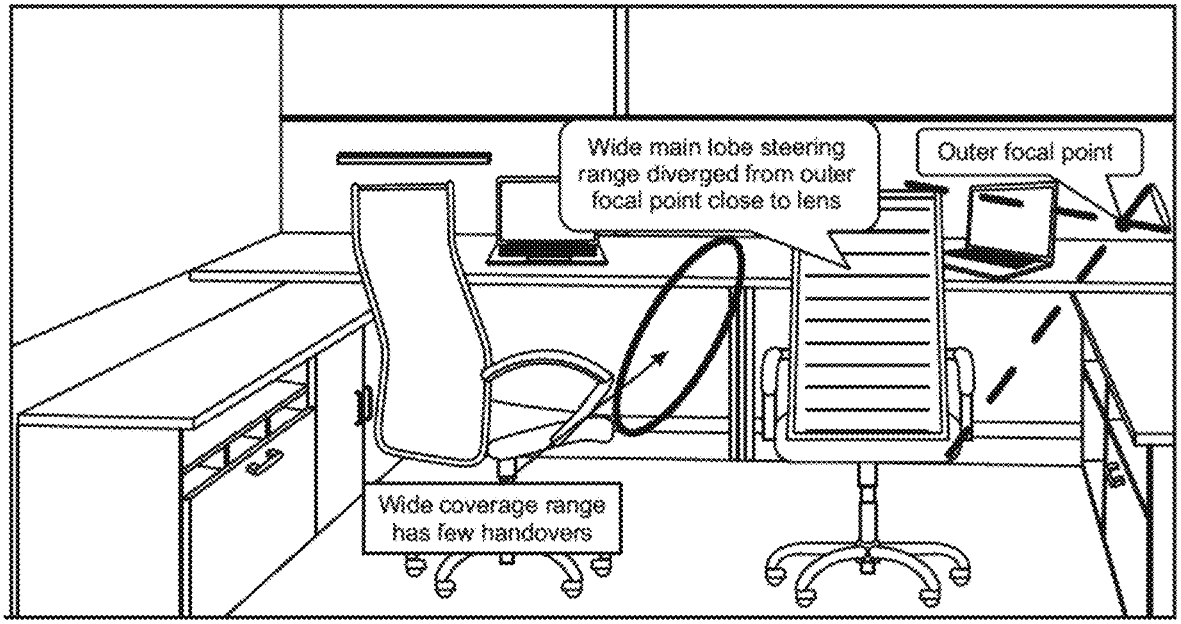
FIG. 19 is a diagram illustrating an application example of the lens antenna according to an embodiment.

FIG. 19 illustrates a micro-scale application example of the lens antenna shown in FIG. 18A. In this application example, a 280 GHz antenna panel (a 32*32 phased array) is placed above the office desk for users to connect laptop and mobile phone on any location within 2 meters. The 32*32 phased array has a half-power beamwidth (HPBW) of 1.875 degrees only.

Figure 20:
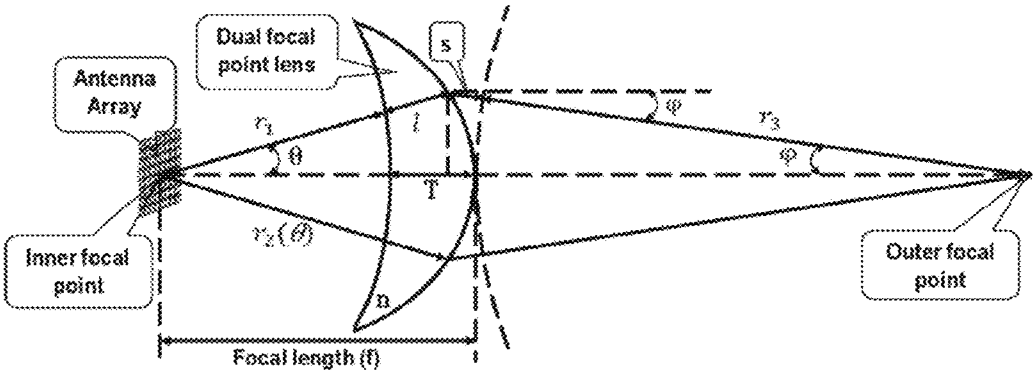
FIG. 20 is a diagram for explaining the designing of a lens antenna according to an embodiment.

FIG. 20 is a diagram for explaining the designing of a lens antenna according to an embodiment. As shown, an elliptical dual focal point lens is taken as an example for explaining the lens profile designing. All rays refracted by the lens are converged to the outer focal point. The shape of the outer surface of the elliptic dual focal point lens in polar coordinates can be obtained by imposing the path length collimation condition as shown below:

$$r_1+nl+s+r_3=r_1+nT+r_3,$$

where $r_3$ is the minimum distance between the outer focal point and the lens. In addition, the following physical length condition is satisfied:

$$(r_1+l)\cos\theta+(s+r_3)\cos\varphi=r_1+T+r_3,$$

$$r_1+l=r_2,$$

$$r_1+T=f,$$

where T is the lens selected thickness along the axis. Then, below quadratic equation can be obtained from the above four equations:

$$(1-n_2)r_2^2+(2n^2T+2n^2r_1+2nr_3+2f\cos\theta-2r_3\cos\theta)r_2-n^2T^2-2n^2Tr_1-n^2r_1^2-2nTr_3-2nr_1r_3+2r_3f+f^2=0$$

where $r_2$ represents the outer surface profile. By solving the roots of the quadratic equation, the shape of the dual focal point lens can be determined. Since optical devices and technologies have been well developed for centuries, the lens antenna according to the embodiment are easy to design by geometrical optics and physical optics methods, and are easy to fabricate by computer numerical control milling machine (CNC), molding and three-dimensional (3D) additive manufacturing.

Figure 21:
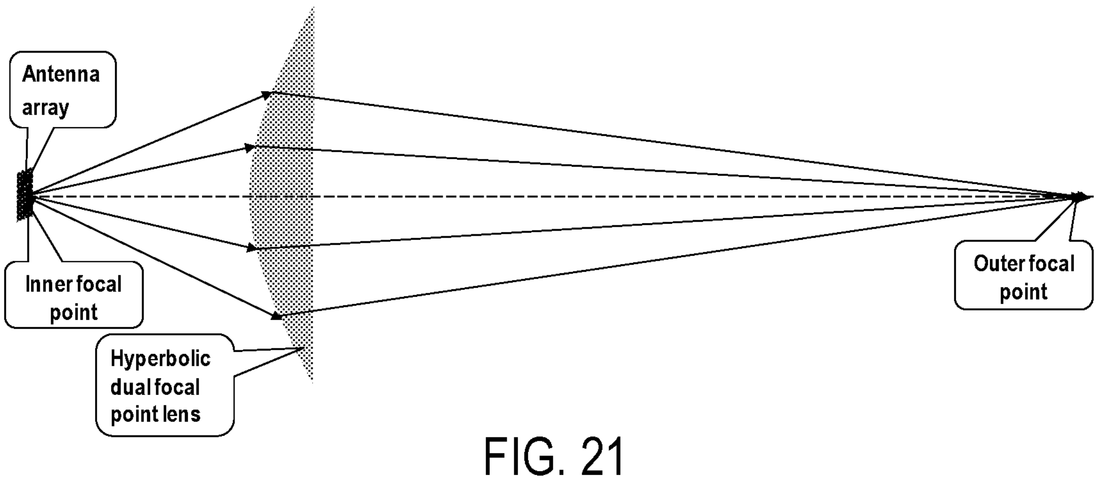
FIG. 21 is a diagram illustrating a lens antenna according to an embodiment.
Figure 22:
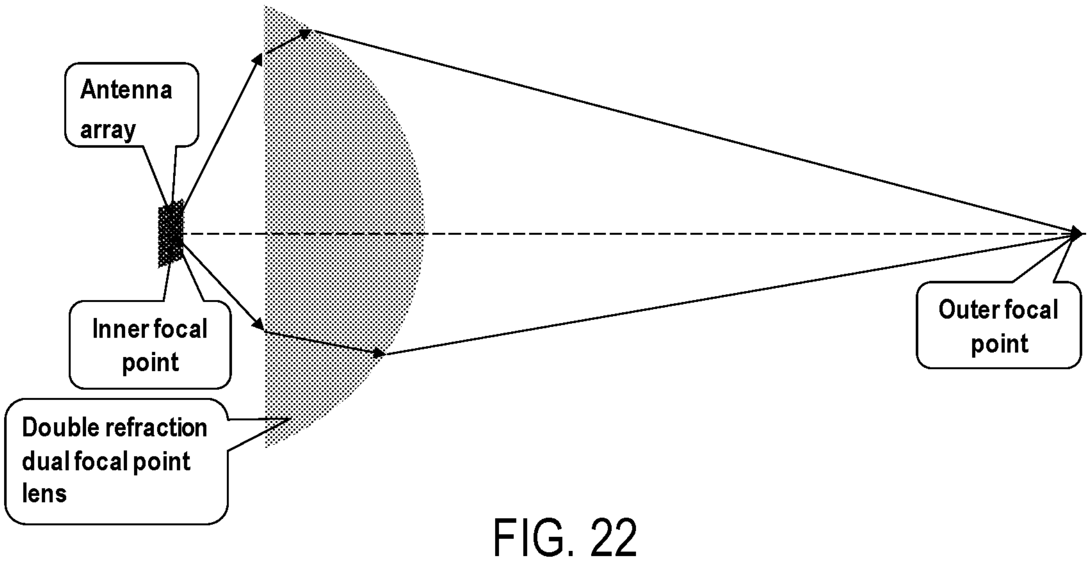
FIG. 22 is a diagram illustrating a lens antenna according to an embodiment.

Although the dual focal point lens has been described as a single refraction elliptical lens in the above embodiments, the present disclosure is not limited to this example. As another example, a single refraction hyperbolic dual focal point lens may be used as the lens, as shown in FIG. 21. As still another example, a double refraction dual focal point lens may be used as the lens, as shown in FIG. 22. As yet another example, any other suitable type of lens having two focal points may be used as the lens. The profiles of other lens types can be calculated in a way similar to the single refraction elliptical lens. As yet another example, instead of a single lens, a combination of more than one lens which has two focal points may be used. For instance, a pair of convex lenses spaced apart may be used in combination to act as a dual focal point lens. As yet another example, the antenna array is not limited to be located strictly at the inner focal point of the lens. Instead, the antenna array may be disposed to be spaced from the inner focal point by a certain distance as long as it is disposed at the inner side of the lens.

Based on the above description, at least one aspect of the disclosure provides a lens antenna. The lens antenna comprises an antenna array and a lens unit having a first focal point at a first side of the lens unit and a second focal point at a second side of the lens unit opposite to the first side. The lens unit is able to cause at least part of beams emitted from the antenna array at the first side of the lens unit to be converged at the second side of the lens unit.

In addition, the disclosure also provides a radio unit comprising the lens antenna described above and a base station comprising the radio unit. The other configurations of the radio unit and the base station may be well known to those skilled in the art and their details are omitted here for brevity.

Unless otherwise defined, all terms used herein (including technical and scientific terms) have the same meaning as commonly understood by those skilled in the art. It should be further understood that terms, such as those defined in commonly used dictionaries, should be interpreted as having a meaning that is consistent with their meaning in the context of the specification and the relevant art and should not be interpreted in an ideal or excessively formal sense unless clearly defined in the present disclosure.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. As used herein, the statement that two or more parts are "coupled", "connected" or "cascaded" together shall mean that the parts are joined together either directly or joined through one or more intermediate parts.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It is to be understood that the orientation or position relationships indicated by the terms such as “top”, “bottom”, “left”, “right”, etc. are the orientation or position relationships based on the drawings, which are only used to facilitate the description of the present disclosure or simplify the description, and are not intended to indicate or suggest that the members, components or apparatuses should have the specific orientations, or should be manufactured and operated in the specific orientations. Therefore, the terms should not be construed as limiting the present disclosure.

As used herein, the term “examples” particularly when followed by a listing of terms is merely exemplary and illustrative, and should not be deemed to be exclusive. It should be noted that various aspects of the present disclosure may be implemented individually or in combination with one or more other aspects. Furthermore, the detailed description and specific embodiments are intended for purposes of illustration only and are not intended to limit the scope of the disclosure.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

The invention claimed is:

1. A lens antenna comprising:

an antenna array; and a lens unit having a first focal point at a first side of the lens unit and a second focal point at a second side of the lens unit opposite the first side, wherein the lens unit is arranged to cause at least a part of the beams emitted from the antenna array at the first side of the lens unit to converge at the second side of the lens unit, the antenna array is arranged to emit, at the first focal point, a main lobe beam and a plurality of side lobe beams that are divergent from the main lobe beam; and the lens unit is arranged to converge the main lobe beam and the plurality of side lobe beams to the second focal point.

2. The lens antenna according to claim 1, wherein the lens unit is arranged to converge, to the antenna array, at least part of beams emitted from a terminal device within an expected coverage range of the lens antenna.

3. The lens antenna according to claim 1, wherein a distance between the lens unit and the second focal point is based on an expected coverage range of the lens antenna.

4. The lens antenna according to claim 1, wherein when the lens unit is arranged to cause part of the beams emitted from the antenna array at the first side to converge at the second side, the lens unit includes a hole penetrating through the lens unit such that another part of the beams emitted from the antenna array at the first side can propagate through the hole without being caused to converge at the second side.

5. The lens antenna according to claim 4, wherein the hole is arranged at a center of the lens unit.

6. The lens antenna according to claim 1, wherein the lens unit is a single lens.

7. The lens antenna according to claim 6, wherein the single lens is one of the following:

a single refraction elliptical lens;

a single refraction hyperbolic lens;

a double refraction lens; and a Maxwell fish-eye lens.

8. The lens antenna according to claim 1, wherein the lens unit is a combination of multiple lenses.

9. The lens antenna according to claim 8, wherein the combination of multiple lenses is a pair of convex lenses spaced apart.

10. The lens antenna according to claim 1, wherein the lens antenna is arranged to operate at frequencies above 24.25 GHz.

11. A radio unit comprising the lens antenna according to claim 1.

12. A base station comprising the radio unit according to claim 11.

* * * * *